US009364797B2

(12) United States Patent
Reddy et al.

(10) Patent No.: US 9,364,797 B2
(45) Date of Patent: Jun. 14, 2016

(54) HIGH FLUX HOLLOW FIBER ULTRAFILTRATION MEMBRANES AND PROCESS FOR THE PREPARATION THEREOF

(75) Inventors: Alamuru Venktarami Reddy, Bhavnagar (IN); Paramita Ray, Bhavnagar (IN); Puyam Sobhindro Singh, Bhavnagar (IN); Parashuram Kallem, Bhavnagar (IN); Sandipkumar Maurya, Bhavnagar (IN); Jitendra Jaydevprasad Trivedi, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 393 days.

(21) Appl. No.: 13/819,692

(22) PCT Filed: Sep. 13, 2011

(86) PCT No.: PCT/IB2011/002124
§ 371 (c)(1),
(2), (4) Date: May 3, 2013

(87) PCT Pub. No.: WO2012/035402
PCT Pub. Date: Mar. 22, 2012

(65) Prior Publication Data
US 2013/0213875 A1    Aug. 22, 2013

(30) Foreign Application Priority Data

Sep. 14, 2010 (IN) ............................ 2178/DEL/2010

(51) Int. Cl.
*B01D 39/00* (2006.01)
*B29C 47/00* (2006.01)
(Continued)

(52) U.S. Cl.
CPC .............. *B01D 71/68* (2013.01); *B01D 61/145* (2013.01); *B01D 69/08* (2013.01); *B01D 69/087* (2013.01);
(Continued)

(58) Field of Classification Search
CPC .... B01D 69/08; B01D 71/68; B01D 2325/36; B01D 67/0093

USPC ............ 210/500.27, 500.41, 500.43, 500.42; 527/21
See application file for complete search history.

(56) References Cited

U.S. PATENT DOCUMENTS 3,480,495 A * 11/1969 Sohn ...................... C08J 5/2287
156/330
(Continued)

FOREIGN PATENT DOCUMENTS

CN       1110625 A    10/1995

*Primary Examiner* — Ana Fortuna
(74) *Attorney, Agent, or Firm* — Bret E. Field; Rudy J. Ng; Bozicevic, Field & Francis LLP (57) ABSTRACT

The present invention relates to the production of high flux hollow fiber ultrafiltration membrane prepared from poly (acrylonitrile-co-methacrylic acid), (polysulfone and poly (acrylonitrile-co-methacrylic acid)) and (polysulfone and ion exchange resin (sulfonated polystyrene-divinyl benzene copolymer)) blend and the point-of-use filtration unit there from for water purification and disinfection. The produced membrane has an active layer with pore size which effectively rejects pathogens and other bacteria from contaminated water while allowing the passage of water to produce biologically pure water for drinking. Therefore, the present invention relates to development of hollow fiber ultrafiltration membrane that delivers biologically pure water at a desirable rate, that is at a rate 25-200 liters/m2.h. The membrane performance in terms of flux and rejection efficiency is dependent on polymer material type and surface properties. The hollow fiber membrane with interpenetrated structure prepared from a blend of polysulfone and a copolymer of acrylonitrile and methacrylic acid is advantageous over the membranes made either from polysulfone or the copolymer alone in terms of durability, strength, elasticity, smoothness, flux, separation efficiency, fouling resistance properties. The surface modified blend membranes with acid groups which have smaller pore size and surface charge exhibit further improvement in the separation efficiency. Using the hollow fiber membranes a point-of-use water filtration unit which is simple, compact, inexpensive device that does not require electricity has been developed to produce 150-300 ml/min product water when attached to a tab from overhead tank of about 3 meter height.

16 Claims, 2 Drawing Sheets

(51) Int. Cl.
  *B01D 71/68* (2006.01)
  *B01D 61/14* (2006.01)
  *B01D 69/08* (2006.01)
  *B01D 71/82* (2006.01)
  *D01D 10/06* (2006.01)
  *B01D 71/28* (2006.01)
  *B01D 71/40* (2006.01)
  *B01D 71/42* (2006.01)

(52) U.S. Cl.
  CPC ................ *B01D 71/82* (2013.01); *D01D 10/06* (2013.01); *B01D 71/28* (2013.01); *B01D 71/40* (2013.01); *B01D 71/42* (2013.01); *B01D 2323/42* (2013.01)

(56) References Cited

U.S. PATENT DOCUMENTS

| | | | |
|---|---|---|---|
| 5,071,973 A * | 12/1991 | Keller et al. | 536/8 |
| 5,180,750 A * | 1/1993 | Sugaya et al. | 521/32 |
| 5,714,521 A * | 2/1998 | Kedem et al. | 521/27 |
| 7,833,767 B2 * | 11/2010 | Davis et al. | 435/189 |
| 2001/0006160 A1 | 7/2001 | Niklas et al. | |
| 2003/0006188 A1 * | 1/2003 | Constantine | B01D 17/00 210/512.3 |
| 2004/0026315 A1 * | 2/2004 | Han et al. | 210/500.41 |
| 2004/0198849 A1 * | 10/2004 | Aminabhavi et al. | 521/27 |
| 2006/0241192 A1 * | 10/2006 | Kitamura | H01M 8/0291 521/27 |
| 2006/0292208 A1 * | 12/2006 | Vachon | 424/445 |
| 2007/0163950 A1 | 7/2007 | Wechs | |

* cited by examiner

Macrovoids

Skin layer of 2 μm

Figure 3

HIGH FLUX HOLLOW FIBER ULTRAFILTRATION MEMBRANES AND PROCESS FOR THE PREPARATION THEREOF

FIELD OF THE INVENTION

The present invention relates to high flux hollow fiber ultrafiltration membrane prepared from poly(acrylonitrile-co-methacrylic acid), polysulfone+ poly(acrylonitrile-co-methacrylic acid) and polysulfone+ ion exchange resin (sulfonated polystyrene-divinyl benzene copolymer) blend.

Present invention further relates to development of hollow fiber ultrafiltration membrane that delivers biologically pure water at a desirable rate i.e. 50-200 liters/m$^2$.h.

Present invention further relates to point-of-use (POU) water filtration unit there from for water purification and disinfection. Using the hollow fiber membranes a point-of-use water filtration unit which is simple, compact, inexpensive device that does not require electricity has been developed to produce 150-300 ml/min product water when attached to a tab from overhead tank of about 3 meter height.

BACKGROUND OF THE INVENTION

Waterborne diseases due to microbial contamination in drinking water are the major health problems throughout the world and providing safe drinking water to the common man is emerging as one of the major challenges of this century. Water purification systems using membrane processes like reverse osmosis, nanofiltration, ultrafiltration, electrodialysis for filtering and purifying water to obtain safe potable water are available in the market. Among these membrane processes, ultrafiltration process is the most efficient process in terms of productivity because of its high water permeability particularly in the treatment of impure turbid water containing suspended particles, pathogens and other harmful microorganisms. Different membrane types of water ultrafiltration process exist in the market, one of which is based on polymer hollow-fiber.

References may be made to patent JP 2006088148, wherein a process for making a polysulfone ultrafiltration hollow fiber membrane used for water treatment is disclosed. The hollow fiber has sponge structure having 10-220 micron pore size in the inner surface and 0.01-5 microns pore size on the outer surface.

References may be made to patent EP927572-A, wherein a process for making hollow fiber membranes from a spinning dope comprising of polysulfone, polyvinylpyrollidone and organic solvent using mixture of inorganic salt, diethylene glycol and water as internal bore forming liquid and water or water with DEG/CaCl$_2$ as external coagulating liquid has been disclosed. These fibers are having pore size suitable for the separation of cytochrome-C having molecular weight of 12400 g/mol.

References may be made to patent US2004026315-A1, discloses a process for making polysulfone hollow fine fiber membrane from a mixture of polysulfone, a hydrophilic polyvinylpyrrolidone and solvent using melt spinning process having fiber diameter of about 200 micron for application in dialysis.

References may be made to patents CN1557532-A; CN1261197-C, wherein a process of polysulfone fiber making from a mixture of polysulfone and polyvinylpyrollidone through dry and wet spinning process resulting to fiber having 0.7 to 2.0 mm inner diameter for using in city water processing has been disclosed.

References may be made to patent EP 0568045 A1, wherein polysulfone-PVP based hollow fiber membrane where the PVP content in inner skin layer is higher than the outer skin layer by extrusion at 50° C. having fiber diameter of 280 micron for application in body fluid treatment has been disclosed.

References may be made to patent JP 09052028, wherein spinning of polyacrylonitrile hollow fiber after degassing the spinning dope at above room temperature and purging with an inert gas for improving the spinning stability of the PAN fibers has been disclosed.

References may be made to Journal "Separation and Purification Technology 2006, 52(2), 380-387" wherein Yu, D-G et al. reported fabrication of polyacrylonitrile (PAN) hollow fiber membranes from PAN fibers spun via the dry-jet wet spinning process and have shown the influence of draw ratio to the fiber properties.

References may be made to Journal "Journal of Membrane Science 1997, 132(1), 63-71), wherein Yang, M.-C. and Tong, J. H. reported spinning of PAN hollow fiber and modification by surface hydrolysis forming a thin layer of polyacrylic acid on the surface of the hollow fiber having rejection of myoglobin and cytochrome-C having molecular weight of about 12000-16000 g/mol.

References may be made to patent CN 1110625, wherein flat-sheet membranes have been developed from the blend of polyacrylonitrile and polysulfone by solution casting and evaporation techniques.

The prior art have many drawbacks. For example, polysulfone fiber of the prior art is hydrophobic which may result in less flux and more fouling prone while in operation. The PAN fiber being hydrophilic and relatively more flexible with smooth surface is prone to shrinkage and brittleness in dry condition resulting to difficulties in handling and long-term storage.

OBJECTIVE OF THE INVENTION

The main object of the present invention is to prepare high flux ultrafiltration polymeric hollow fiber membranes for water purification and disinfection. Yet another object of the present invention is to prepare a blend hollow fiber ultrafiltration membrane to eliminate the drawbacks of hollow fibers made from homopolymers.

Another objective of the present invention is to prepare a blend fiber of polysulfone and poly(acrylonitrile-co-methacrylic acid) for improvements in the fiber properties like antifouling properties, surface smoothness and flexibility and membrane performance like membrane flux and rejection i.e. separation efficiency.

Yet another object of the present invention is to prepare a blend fiber of polysulfone and a copolymer of poly(acrylonitrile-co-methacrylic acid) having improved properties than either of polysulfone or poly(acrylonitrile-co-methacrylic acid).

Yet another object of the present invention is to enhance pure water flux of polysulfone membranes by incorporation of a poly(acrylonitrile-co-methacrylic acid).

Yet another object of the present invention is to prepare polysulfone and poly(acrylonitrile-methacrylic acid) blend membrane to enhance separation efficiency in removal of suspended solids, turbidity, bacteria and other pathogens from water.

Yet another object of the present invention is to prepare polysulfone and poly(acrylonitrile-co-methacrylic acid) blend membrane to increase elasticity/flexibility for producing more durable membrane.

Yet another object of the present invention is to prepare polysulfone and poly(acrylonitrile-co-methacrylic acid) blend membrane to increase surface smoothness consequently to increase fouling resistance.

Yet another object of the present invention is to prepare polysulfone poly(acrylonitrile-co-methacrylic acid) blend membrane with active skin layer both inner and outer surface to operate either out-to-in or in-to-out fashion for increase in membrane life.

Yet another object of the present invention is to prepare polysulfone and poly(acrylonitrile-co-methacrylic acid) blend membrane with bilayer sponge structure for good mechanical strength without compromising membrane flux.

Yet another object of the present invention is to prepare blend membrane of polysulfone and cation exchange resin (sulfonated polystyrene-divinyl benzene copolymer) to enhance separation efficiency, fouling resistance and product water flux.

Yet another object of the present invention is to prepare hollow fiber membrane based on either polysulfone or the poly(acrylonitrile-co-methacrylic acid) for the evaluation of membrane performance in comparison with the blend or surface modified blend fibers.

Yet another object of the present invention is to use the hollow fiber as point-of-use water filtration unit.

SUMMARY OF THE INVENTION

Accordingly, present invention provides high flux, hollow fiber ultrafiltration polymeric membrane comprising blend of polysulfone (PSF) and copolymer in the ratio ranging between 96:4 to 99.5:0.5 (w/w) wherein copolymer is selected from poly(acrylonitrile-co-methacrylic acid) (PANMA) or sulfonated polystyrene-divinyl benzene copolymer as cation exchange resin (CXR).

In an embodiment of the present invention, said membrane optionally comprising poly(acrylonitrile-co-methacrylic acid) (PANMA).

In another embodiment of the present invention, said membrane is useful for water purification, declamation and disinfection.

In yet another embodiment of the present invention, the outer and inner diameter of the fiber is in the range of 1000 to 1100 micrometer and 700 to 750 micrometer respectively.

In yet another embodiment of the present invention, the fiber wall thickness is in the range of 250 to 350 micrometer.

In yet another embodiment of the present invention, outer and inner skin layer thickness is in the range of 1.7 to 2 μm.

In yet another embodiment of the present invention, Nephelometric Turbidity Unit (NTU) reduction percentage is in the range of 98-99.5% from feed water having up to 100 NTU.

In yet another embodiment of the present invention, bacterial reduction log value of said membrane is in the range of 4 to 6.

In yet another embodiment of the present invention, molecular weight cut-off (MWCO) is in the range of 20 to 50 KDa based on polyethylene glycol separation.

In yet another embodiment of the present invention, pure water flux is in the range of 80 to 250 l/m².h, bursting pressure is in the range of 45 to 50 psi, flux recovery ratio is in the range of 80 to 95 and separation efficiency of 20 k Da polyethylene glycol is in the range of 60 to 90.

In yet another embodiment of the present invention, pure water permeability is in the range of 50-200 liters/m².hr at 20 to 25 psi.

In another embodiment, a process for the preparation of high flux, hollow fiber ultrafiltration polymeric membrane comprising the steps of:

dissolving 19-20% w/w polysulphone, 2-5% w/w polyvinylpyrrolidone and 0.2 to 0.8% w/w copolymer in 70-80% w/w polar organic solvent under constant stirring at rate in the range of 1400 to 1600 rpm at a temperature in the range of 80 to 100° C. for period in the range of 3 to 4 hours to prepare a transparent spinning dope;

extruding spinning dope as obtained in step (i) through external orifice of a double orifice spinneret maintaining extrusion rate in the range of 30 to 100 g/minute by pushing at 17 to 20 psi nitrogen pressure;

flowing water through the internal orifice of a double orifice spinneret maintaining flow rate is in the range of 20 to 50 ml/minute;

maintaining extrusion rate in the range of 35 to 42 meters/minute for period in the range of 3 to 4 hrs;

gelling the outer surface of the extruded hollow fiber in water bath maintained at temperature in the rage of 25 to 30° C. followed by washing with water and immerging in methanol for period in the range of 4 to 5 hrs to obtain hollow fiber ultrafiltration polymeric membrane.

In yet another embodiment of the present invention, copolymer used is selected from poly(acrylonitrile-co-methacrylic acid) or sulfonated polystyrene-divinyl benzene copolymer as cation exchange resin (CXR).

In yet another embodiment of the present invention, organic solvent used is selected from the group consisting of dimethylformamide (DMF), N-Methyl-2-pyrrolidone (NMP) or Dimethyl sulfoxide (DMSO).

In yet another embodiment of the present invention, the membranes were spun with a production rate of 3000 to 10,800 meters length in a batch.

In yet another embodiment of the present invention, water filtration unit was made using the hollow fiber ultrafiltration membrane.

In yet another embodiment of the present invention, water filtration unit was made which is simple, compact, inexpensive, does not require electricity producing 150-300 ml/min product water when attached to a tab from overhead tank of about 3 meter height.

DETAIL DESCRIPTION OF THE INVENTION

Figure 3:
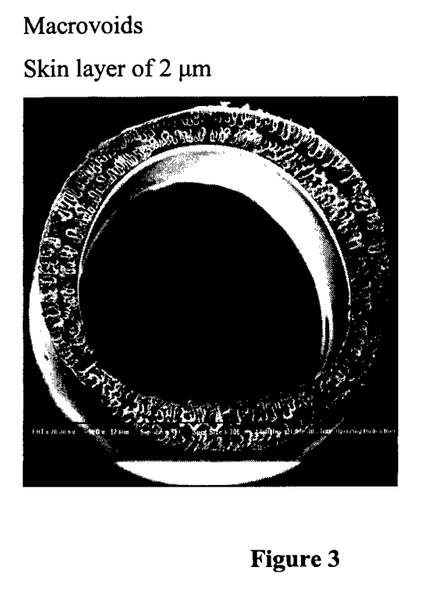
FIG. 3 represents the scanning electron microscopy photographs of the hollow fibers indicating their morphology.

The present invention relates to the development of hollow fiber membrane prepared from poly(acrylonitrile-co-methacrylic acid), polysulfone+ poly(acrylonitrile-co-methacrylic acid) and polysulfone+ ion exchange resin (sulfonated polystyrene-divinyl benzene copolymer) blend for drinking water purification and water reclamation. The membrane can produce safe drinking water by physical exclusion of microorganisms, turbidity, etc., from contaminated water. The blend hollow fiber membrane is relatively more flexible, easy to handle, durable, fouling resistant and of high flux in comparison with the fibers made from polysulfone or poly (acrylonitrile-methacrylic acid). Improvement in the separation efficiency can be achieved by the surface modified blend membranes with acid groups which have smaller pore size and surface charge. Such hollow fiber membranes developed here can be utilised as point-of-use water filtration unit which is simple, compact, and inexpensive and requires no electricity. The other noteworthy features are: i) the membranes have active skin layer on both inner and outer surface to operate either out-to-in or in-to-out fashion for flexible operational design and intermittent washing thereby increasing the membrane life; (ii) The membrane has bilayer sponge microstructure of which each layer comprised of dense skin layer cushioned by sponge layer comprised of macrovoids as shown in FIG. 3 for extra strength and high flux.

The developed membrane has an active layer with pore size which effectively rejects pathogens and other bacteria from contaminated water while allowing the passage of water to produce biologically pure water for drinking. Present invention provides hollow fiber ultrafiltration membrane that delivers biologically pure water at a desirable rate that is at a rate 50-200 liters/$m^2$.h. The membrane performance in terms of flux and rejection efficiency is dependent on polymer material type and surface properties. The hollow fiber membrane with interpenetrated structure prepared from poly(acrylonitrile-co-methacrylic acid), polysulfone+ poly (acrylonitrile-co-methacrylic acid) and polysulfone+ ion exchange resin (sulfonated polystyrene-divinyl benzene copolymer) is advantageous over the membranes made either from polysulfone or the copolymer alone in terms of durability, strength, elasticity, smoothness, flux, separation efficiency, fouling resistance properties. The surface modified blend membranes with acid groups which have smaller pore size and surface charge exhibit further improvement in the separation efficiency.

In the present invention, the following terminology has been used as:—

Membrane flux: Indicates the volume of water which is being permeated out (passing out) of the 1 $m^2$ of the membrane per hour (1/$m^2$.h)

NTU (Nephelometric Turbidity Unit): This unit is used to indicate the rejection of the membrane for particulate material from liquid solutions.

MWCO (Molecular weight cut off) value: Indicates the lowest molecular weight of the polymer or any solute for which the membrane exhibits more than 90% rejection when tested using the solution of the polymer or solute. The units are KDa (Kilo Daltons) or Da (Daltons).

Bursting pressure: Indicates the bursting strength (toleration) of the fibers when air/liquid was passed through it under some pressurized condition.

Separation efficiency: Indicates the efficiency of the membrane to reject different solutes when tested using their solutions.

Water permeability: Similar to membrane flux (given above).

Figure 2:
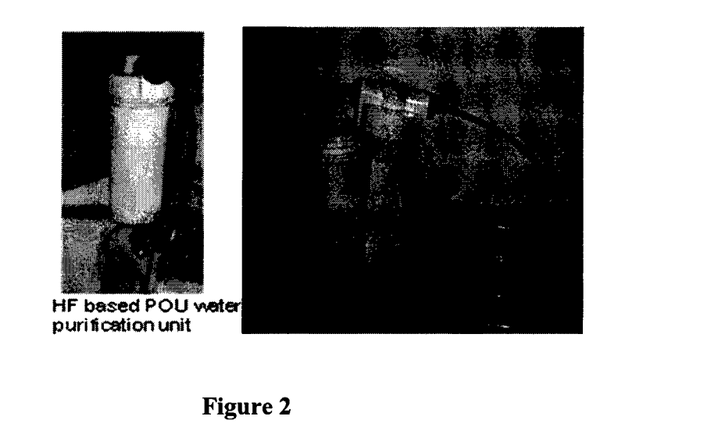
FIG. 2 represent hollow fibre membrane based point-of-use (POU) water purification device.

Present invention further relates to point-of-use filtration unit (Water filtration Unit) there from for water purification and disinfection. In this unit, hollow fibre ultrafiltration membranes are bundled together with potting adhesive in such a way that both the ends of the fibre are together on the same side like "U" shape and fixed in the cap, the cap holder with water inlet and out let connections and the cylindrical container to fix the cap (FIG. 2).

Using the hollow fiber membranes a point-of-use water filtration unit which is simple, compact, inexpensive device that does not require electricity has been developed to produce 150-300 ml/min product water when attached to a tab from overhead tank of about 3 meter height.

Figure 1:
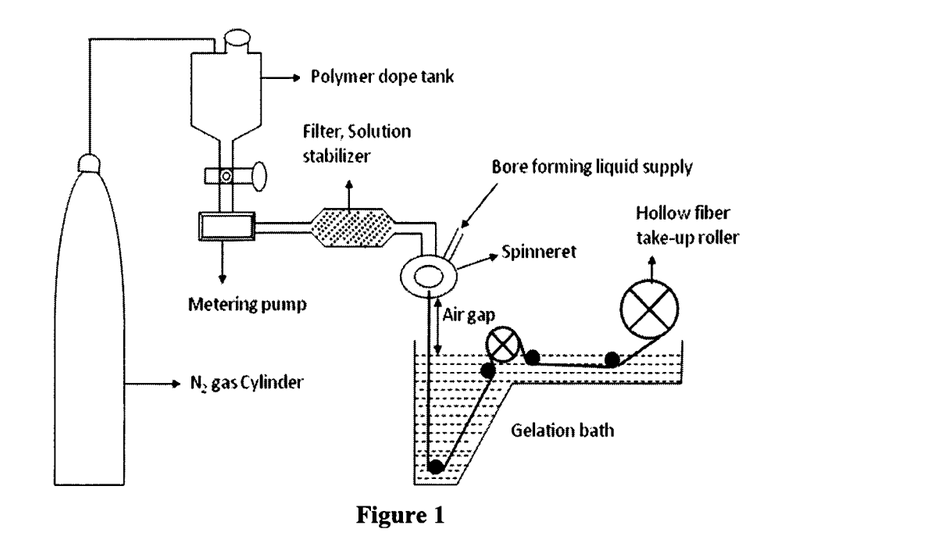
FIG. 1: Schematic depiction of a typical hollow fiber spinning unit. The details of the hollow fiber spinning unit are shown schematically in FIG. 1. The HF spinning line consists of: i) polymer solution tank ii) Metering Pump iii) Solution stabilizing container iv) Annular Spinneret v) Gelation bath vi) fiber drawing roller and vii) Fiber winding roller.

The details of the hollow fiber spinning unit are shown schematically in FIG. 1. The HF spinning line consists of: i) polymer solution tank ii) Metering Pump iii) Solution stabilizing container iv) Annular Spinneret v) Gelation bath vi) fiber drawing roller and vii) Fiber winding roller.

In the hollow fiber spinning process, polymer solution was first transferred to the clean and dry polymer solution tank which in turn was connected to nitrogen gas cylinder. The polymer solution was pushed at about 20 psi nitrogen pressure to the pump which in turn delivers the solution to the double orifice spinneret which has 0.5, 1.0, 1.5 mm annular holes. The polymer solution was extruded through the outer orifice at the rate of 33-35 g/min while RO water was passed at the rate of 24-25 ml/min through the central orifice of the spinneret. This results in the formation of the lumen inside the fiber by phase inversion process of the polymer solution because; water is the non-solvent for the polymer. The outer surface of the hollow fibers membranes was gelled by phase inversion process in a water bath at 25° C. For a 4 Kg polymer solution batch, spinning was continued for about 100 minutes and thus producing hollow fiber of 3300-3500 m length. The hollow fibers were then washed with water thoroughly and immersed in methanol for 2 hrs. The hollow fibers thus obtained were stored in RO water containing 10% glycerol and 1% formalin.

TABLE 1

Hollow Fiber Properties of different membranes

| Properties | Polysulfone (PSF) | Poly (acrylonitrile-methacrylic acid) (PANMA) | PSF-PANMA blend[a] | PSF-CXR blend[b] |
|---|---|---|---|---|
| Separation efficiency of 20 KDa PEG | 62 | 33 | 89 | 60 |
| Elasticity/flexibility | Flexible | Brittle on drying | Flexible | Flexible |
| Surface smoothness | Relatively rough | Very smooth | Smooth | Smooth |
| Fouling resistance (Flux Recovery ratio) | 71 | 85 | 80 | 93 |
| Mechanical strength (bursting pressure) | 50 psi | 50 psi | 50 psi | 50 psi |
| Membrane performance (pure water flux, l/$m^2 \cdot$ h) | 70 | 212 | 150 | 86 |

[a]19.8% (w/w) PSF and 0.2% (w/w) PANMA;
[b]20% (w/w) PSF and 0.4% (w/w) CXR

In the above table, the data indicates that the polysulfone membrane exhibit lower water flux but somewhat higher separation efficiency and the PANMA membrane exhibits very high water flux but low separation efficiency. The PSF-PANMA and PSF-CXR blend membranes exhibit high rejection as well as higher water flux than PSF alone but somewhat lower than PANMA. Besides, these membranes also exhibit higher fouling resistance as compared to PSF alone.

EXAMPLES

These examples are given by way of illustration therefore these should not be construed to limit the scope of the present invention.

Example 1

UF Membrane Prepared from Polysulphone Only

A mixture of polysulphone (20%, w/w) and polyvinylpyrrolidone (2%, w/w) was dissolved in dimethylformamide (78%, w/w) under constant stirring rate of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 25 ml/minute acts as bore former by causing the phase inversion in the inner part of the polysulphone hollow fiber. The extrusion rate was maintained at 35 meters/minute for the duration of 4 hours and the outer surface of the extruded hollow fiber was also gelled in water bath maintained at the temperature of 23° C. The hollow fibers of 8400 m length thus obtained from the dope solution of 9 L was washed thoroughly with water and immersed in methanol for 4 hrs. The hollow fibers were then preserved in RO water containing 10% glycerol and 1% formalin. Table 2 gives the characteristics and performance of the hollow fibers.

TABLE 2

| Hollow Fiber characteristics and performance | |
|---|---|
| Hollow Fiber Inner diameter (micrometer) | 650 |
| Hollow Fiber Outer diameter (micrometer) | 1000 |
| Hollow Fiber Wall thickness (micrometer) | 175 |
| Pure water permeability at 25 psi (liters/m$^2$ · hr) | 70 |
| NTU reduction, % | 99 |
| Bacterial reduction (log value) | 6 |
| PEG 35000, % rejection | 80 |
| PEG 20000, % rejection | 62 |
| PEG 10000, % rejection | 45 |
| MWCO (molecular weigh cut-off) (Da) | 91000 |

Example 2

UF Membrane Prepared from Polysulphone Only

A mixture of polysulphone (22%, w/w) and polyvinylpyrrolidone (2%, w/w) was dissolved in dimethylformamide (76%, w/w) under constant stirring of 1400 rpm at a temperature of 80° C. for 4 hours to prepare a transparent spinning dope. The spinning dope was extruded under nitrogen environment through a double orifice spinneret. The water flowed through the inner nozzle of the spinneret at the rate of 25 ml/minute acts as lumen former by causing the phase inversion in the inner part of the polysulphone hollow fiber. The extrusion rate was maintained at 35 meters/minute for the duration of 2 hours and the outer surface of the extruded hollow fiber was also gelled in water bath maintained at the temperature of 25° C. The hollow fibers of 4200 m length thus obtained from the dope solution of 4.5 L was washed thoroughly with water and immersed in methanol for 4 hrs. The hollow fibers were then preserved in RO water containing 10% glycerol and 1% formalin. Table 3 gives the characteristics and performance of the hollow fibers.

TABLE 3

| Hollow Fiber characteristics and performance | |
|---|---|
| Hollow Fiber Inner diameter (micrometer) | 650 |
| Hollow Fiber Outer diameter (micrometer) | 1000 |
| Hollow Fiber Wall thickness (micrometer) | 175 |
| Pure water permeability at 25 psi (liters/m$^2$ · hr) | 71 |
| NTU reduction, % | >99 |
| Bacterial reduction (log value) | 6 |
| PEG 35000, % rejection | 89 |
| PEG 20000, % rejection | 62 |
| PEG 10000, % rejection | 45 |
| MWCO (molecular weight cut-off) (Da) | 37000 |

Example 3

UF Membrane Prepared from Polysulphone Only

A mixture of polysulphone (24%, w/w) and polyvinylpyrrolidone (4%, w/w) was dissolved in dimethylformamide (72%, w/w) under constant stirring of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 25 ml/minute acts as bore former by causing the phase inversion in the inner part of the polysulphone hollow fiber. The extrusion rate was maintained at 35 meters/minute for the duration of 1 hour and the outer surface of the extruded hollow fiber was also gelled in water bath maintained at the temperature of 27° C. The hollow fibers of 2100 m length thus obtained from the dope solution of 2 L was washed thoroughly with water and immersed in methanol for 4 hrs. The hollow fibers were then preserved in RO water containing 10% glycerol and 1% formalin. Table 4 gives the characteristics and performance of the hollow fibers.

TABLE 4

| Hollow Fiber characteristics and performance | |
|---|---|
| Hollow Fiber Inner diameter (micrometer) | 650 |
| Hollow Fiber Outer diameter (micrometer) | 1000 |
| Hollow Fiber Wall thickness (micrometer) | 175 |
| Pure water permeability at 25 psi (liters/m$^2$ · hr) | 52 |
| NTU reduction, % | 99.5 |
| Bacterial reduction (log value) | 6 |
| PEG 35000, % rejection | 99 |
| PEG 20000, % rejection | 95 |
| PEG 10000, % rejection | 89 |
| MWCO (molecular weight cut-off) (Da) | 12000 |

Example 4

UF Membrane Prepared from Polysulphone Only

A mixture of polysulphone (24%, w/w) and polyvinylpyrrolidone (8%, w/w) was dissolved in dimethylformamide (68%, w/w) under constant stirring of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 25 ml/minute acts as bore former by causing the phase inversion in the inner part of the polysulphone hollow fiber. The extrusion rate was maintained at 35 meters/minute for the duration of 1 hour and the outer surface of the extruded hollow fiber was also gelled in water bath maintained at the temperature of 25° C. The hollow fibers of 2100 m length thus obtained from the dope solution of 2 L was washed thoroughly with water and immersed in methanol for 4 hrs. The hollow fibers were then preserved in RO water containing 10% glycerol and 1% formalin. Table 5 gives the characteristics and performance of the hollow fibers.

TABLE 5

Hollow Fiber characteristics and performance

| | |
|---|---|
| Hollow Fiber Inner diameter (micrometer) | 650 |
| Hollow Fiber Outer diameter (micrometer) | 1000 |
| Hollow Fiber Wall thickness (micrometer) | 175 |
| Pure water permeability at 25 psi (liters/m$^2$·hr) | 92 |
| NTU reduction, % | 99 |
| Bacterial reduction (log value) | 6 |
| PEG 35000, % rejection | 99.2 |
| PEG 20000, % rejection | 85 |
| PEG 10000, % rejection | 52 |
| MWCO (molecular weight cut-off) (Da) | 27000 |

Example 5

UF Membrane Prepared from poly(acrylonitrile-co-methacrylic acid) only

A mixture of poly(acrylonitrile-co-methacrylic acid) (18%, w/w) was dissolved in dimethylformamide (82%, w/w) under constant stirring of 1600 rpm at a temperature of 80 C for 4 hours to prepare a transparent spinning dope. The spinning dope was extruded under nitrogen environment through a double orifice spinneret. The water flowed through the inner nozzle of the spinneret at the rate of 25 ml/minute acts as bore former by causing the phase inversion in the inner part of the poly(acrylonitrile-co-methacrylic acid) hollow fiber. The extrusion rate was maintained at 30 meters/minute for the duration of 4 hours and the outer surface of the extruded hollow fiber was also gelled in water bath maintained at the temperature of 25° C. The hollow fibers of 7200 m length thus obtained from the dope solution of 7.5 L was washed thoroughly with water and immersed in methanol for 4 hrs. The hollow fibers were then preserved in RO water containing 10% glycerol and 1% formalin. Table 6 gives the characteristics and performance of the hollow fibers.

TABLE 6

Hollow Fiber characteristics and performance

| | |
|---|---|
| Inner diameter (micrometer) | 900 |
| Outer diameter (micrometer) | 1200 |
| Wall thickness (micrometer) | 150 |
| Pure water permeability at 25 psi (liters/m$^2$·hr) | 212 |
| NTU reduction, % | 99 |
| Bacterial reduction (log value) | 4 |
| PEG 35000, % rejection | 77 |
| PEG 20000, % rejection | 33 |
| PEG 10000, % rejection | 20 |
| MWCO (molecular weight cut-off) (Da) | 46000 |

Example 6

UF Membrane Prepared from the Blend of Polysulphone and poly(acrylonitrile-co-methacrylic acid)

A mixture of polysulphone (19.5%, w/w) and polyvinylpyrrolidone (2%, w/w) and poly(acrylonitrile-co-methacrylic acid) (0.5%, w/w) was dissolved in dimethylformamide (78%, w/w) under constant stirring rate of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 40 ml/minute acts as bore former by causing the phase inversion in the inner part of the polysulphone hollow fiber. The extrusion rate was maintained at 40 meters/minute for the duration of 4 hour and the outer surface of the extruded hollow fiber was also gelled in water bath maintained at the temperature of 27° C. The hollow fibers of 9600 m length thus obtained from the dope solution of 10 L was washed thoroughly with water and immersed in methanol for 4 hrs. The hollow fibers thus obtained were stored in RO water containing 10% glycerol and 1% formalin. The fiber characteristics are given in Table 7.

TABLE 7

Fiber characteristics and performance

| | |
|---|---|
| Inner diameter (micrometer) | 700 |
| Outer diameter (micrometer) | 1000 |
| Wall thickness (micrometer) | 150 |
| Pure water permeability at 25 psi (liters/m$^2$·hr) | 120 |
| NTU % reduction, initial NTU (Nephelometric Turbidity Unit) | 99, 100 |
| Bacterial reduction (log value) | 4 |
| PEG 35000, % rejection | 99 |
| PEG 20000, % rejection | 85 |
| PEG 10000, % rejection | 82 |
| PEG 6000, % rejection | 49 |
| MWCO (molecular weight cut-off) (Da) | 20000 |

Example 7

UF Membrane Prepared from the Blend of Polysulphone and poly(acrylonitrile-co-methacrylic acid)

A mixture of polysulphone (19.2%, w/w) and polyvinylpyrrolidone (2%, w/w) and poly(acrylonitrile-co-methacrylic acid) (0.8%, w/w) was dissolved in dimethylformamide (78%, w/w) under constant stirring rate of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 40 ml/minute acts as bore former by causing the phase inversion in the inner part of the polysulphone hollow fiber. The extrusion rate was maintained at 35 meters/minute for the duration of 4 hours and the outer surface of the extruded hollow fiber was also gelled in water bath maintained at the temperature of 25° C. The hollow fibers of 8400 m length thus obtained from the dope solution of 9 L was washed thoroughly with water and immersed in methanol for 4 hrs. The hollow fibers were then preserved in RO water containing 10% glycerol and 1% formalin. Table 8 gives the characteristics and performance of the hollow fibers.

TABLE 8

Hollow Fiber characteristics and performance

| | |
|---|---|
| Inner diameter (micrometer) | 750 |
| Outer diameter (micrometer) | 1000 |

TABLE 8-continued

Hollow Fiber characteristics and performance

| | |
|---|---|
| Wall thickness (micrometer) | 125 |
| Pure water permeability at 25 psi (liters/m$^2$ · hr) | 150 |
| NTU reduction, % | 99 |
| Bacterial reduction (log value) | 6 |
| PEG 35000, % rejection | 99 |
| PEG 20000, % rejection | 72 |
| PEG 10000, % rejection | 48 |
| PEG 6000, % rejection | 42 |
| MWCO (molecular weight cut-off) (Da) | 30000 |

Example 8

UF Membrane Prepared from the Blend of Polysulphone and poly(acrylonitrile-co-methacrylic acid)

A mixture of polysulphone (19.8%, w/w) and polyvinylpyrrolidone (2%, w/w) and poly(acrylonitrile-co-methacrylic acid) (0.2%, w/w) was dissolved in dimethylformamide (78%, w/w) under constant stirring rate of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 50 ml/minute acts as bore former by causing the phase inversion in the inner part of the polysulphone hollow fiber. The extrusion rate was maintained at 42 meters/minute for the duration of 4 hours and the outer surface of the extruded hollow fiber was also gelled in water bath maintained at the temperature of 27° C. The hollow fibers of 10080 m length thus obtained from the dope solution of 11.5 L was washed thoroughly with water and immersed in methanol for 4 hrs. The hollow fibers were then preserved in RO water containing 10% glycerol and 1% formalin. Table 9 gives the characteristics and performance of the hollow fibers.

TABLE 9

Hollow Fiber characteristics and performance

| | |
|---|---|
| Fiber Inner diameter (micrometer) | 750 |
| Fiber Outer diameter (micrometer) | 1100 |
| Fiber wall thickness (micrometer) | 175 |
| Pure water permeability at 25 psi (liters/m$^2$ · hr) | 150 |
| NTU reduction, % | 99 |
| Bacterial reduction (log value) | 6 |
| PEG 35000, % rejection | 99 |
| PEG 20000, % rejection | 89 |
| PEG 10000, % rejection | 78 |
| PEG 6000, % rejection | 34 |
| MWCO (molecular weight cut-off) (Da) | 21000 |

Example 9

UF Membrane Prepared from the Blend of Polysulfone and Cation Exchange Resin (sulfonated polystyrene-divinyl benzene copolymer)

A mixture of polysulphone (20%, w/w) and polyvinylpyrrolidone (2%, w/w) and cation exchange resin (sulfonated polystyrene-divinyl benzene copolymer (0.4%, w/w) was dissolved in dimethylformamide (77.6%, w/w) under constant stirring rate of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 25 ml/minute acts as bore former by causing the phase inversion in the inner part of the polysulphone hollow fiber. The extrusion rate was maintained at 35 meters/minute for the duration of 4 hours and the outer surface of the extruded hollow fiber was also gelled in water bath maintained at the temperature of 27° C. The hollow fibers of 8400 m length thus obtained from the dope solution of 9 L was washed thoroughly with water and immersed in methanol for 4 hrs. The hollow fibers were then preserved in RO water containing 10% glycerol and 1% formalin. Table 10 gives the characteristics and performance of the hollow fibers.

TABLE 10

Hollow Fiber characteristics and performance

| | |
|---|---|
| Fiber Inner diameter (micrometer) | 800 |
| Fiber Outer diameter (micrometer) | 1100 |
| Fiber wall thickness (micrometer) | 150 |
| Pure water permeability at 25 psi (liters/m$^2$ · hr) | 86 |
| NTU reduction, % | 99 |
| Bacterial reduction (log value) | 6 |
| PEG 35000, % rejection | 84 |

Example 10

UF Membrane Prepared from the Blend of Polysulfone and Cation Exchange Resin (sulfonated polystyrene-divinyl benzene copolymer)

A mixture of polysulphone (20%, w/w) and polyvinylpyrrolidone (2%, w/w) and cation exchange resin (sulfonated polystyrene-divinyl benzene copolymer (0.6%, w/w) was dissolved in dimethyl formamide (77.4%, w/w) under constant stirring rate of 1400 rpm at a temperature of 80 C for 4 hours to prepare a transparent spinning dope. The spinning dope was extruded under nitrogen environment through a double orifice spinneret. The water flowed through the inner nozzle of the spinneret at the rate of 25 ml/minute acts as bore former by causing the phase inversion in the inner part of the polysulphone hollow fiber. The extrusion rate was maintained at 35 meters/minute for the duration of 4 hours and the outer surface of the extruded hollow fiber was also gelled in water bath maintained at the temperature of 25° C. The hollow fibers of 8400 m length thus obtained from the dope solution of 9 L was washed thoroughly with water and immersed in methanol for 4 hrs. The hollow fibers were then preserved in RO water containing 10% glycerol and 1% formalin. Table 11 gives the characteristics and performance of the hollow fibers.

TABLE 11

Hollow Fiber characteristics and performance

| | |
|---|---|
| Fiber Inner diameter (micrometer) | 800 |
| Fiber Outer diameter (micrometer) | 1100 |
| Fiber wall thickness (micrometer) | 150 |
| Pure water permeability at 25 psi (liters/m$^2$ · hr) | 86 |
| NTU reduction, % | 99 |
| Bacterial reduction (log value) | 6 |
| PEG 35000, % rejection | 82 |

Advantages of the Invention:

The hollow fiber membranes exhibit solute cut off values in the range of 12000 to 91000 Da and are useful for the treatment of different types of solutions. They exhibit 4-6 log bacterial rejections and are useful for disinfection of drinking water for the removal of harmful pathogens. The presence of methacrylic acid functionality in the hollow fibers increases the negative charge as well as hydrophilicity of the membranes and thus imparts fouling resistance properties for the treatment of water and other contaminated water. The fibers can be used in point of use domestic water purification units as well as large scale purification plants. Because of the presence of hydrophilic functionality, the fibers show very high water fluxes at 10-25 operating pressure and thus making them suitable for domestic point of use system by directly connecting them to a water tap form the over head tank of about 4 meters height and thus obviating the need for pump and electricity.

The invention claimed is:

1. A high flux, hollow fiber ultrafiltration polymeric membrane comprising blend of polysulfone (PSF) and copolymer in the ratio ranging between 96:4 to 99.5:0.5 (w/w) wherein copolymer is selected from poly(acrylonitrile-co-methacrylic acid) (PANMA) or sulfonated polystyrene-divinyl benzene copolymer as cation exchange resin (CXR).

2. The high flux, hollow fiber ultrafiltration polymeric membrane of claim 1, wherein said membrane comprises poly(acrylonitrile-co-methacrylic acid) (PANMA).

3. The high flux, hollow fiber ultrafiltration polymeric membrane of claim 1, wherein said membrane is useful for water purification, declamation and disinfection.

4. The high flux, hollow fiber ultrafiltration membranes of claim 1, wherein the outer and inner diameter of the fiber is in the range of 1000 to 1100 micrometer and 700 to 750 micrometer respectively.

5. The high flux, hollow fiber ultrafiltration membranes of claim 1, wherein the fiber wall thickness is in the range of 125 to 175 micrometer.

6. The high flux, hollow fiber ultrafiltration membranes of claim 1, wherein said membranes comprises an outer and inner skin layer thickness is in the range of 1.7 to 2 μm.

7. The high flux, hollow fiber ultrafiltration membranes of claim 1 characterized by Nephelometric Turbidity Unit (NTU) reduction percentage is in the range of 98-99.5% from feed water having up to 100 NTU.

8. The high flux, hollow fiber ultrafiltration membranes of claim 1 characterized by bacterial reduction log value of said membrane is in the range of 4 to 6.

9. The high flux, hollow fiber ultrafiltration membranes of claim 1 characterized by molecular weight cut-off (MWCO) is in the range of 20 to 50KDa based on polyethylene glycol separation.

10. The high flux, hollow fiber ultrafiltration membranes of claim 1 characterized by pure water flux is in the range of 80 to 250 l/m$^2$.h, bursting pressure is in the range of 45 to 50 psi, flux recovery ratio is in the range of 80 to 95 and separation efficiency of 20 kDa polyethylene glycol is in the range of 60 to 90.

11. The high flux, hollow fiber ultrafiltration membranes of claim 1 characterized by pure water permeability is in the range of 50-200 liters/m$^2$.hr at 20 to 25 psi.

12. A water filtration unit comprising a high flux, hollow fiber ultrafiltration polymeric membrane according to claim 1.

13. The water filtration unit of claim 12, wherein said unit does not require electricity producing 150-300 ml/min product water when attached to a tab from overhead tank of about 3 meter height.

14. A process for the preparation of high flux, hollow fiber ultrafiltration polymeric membrane and the said process comprising the steps of:

a) dissolving 19-20% w/w polysulphone, 2-5% w/w polyvinylpyrrolidone and 0.2 to 0.8% w/w of a copolymer in 70-80% w/w polar organic solvent under constant stirring at rate in the range of 1400 to 1600 rpm at a temperature in the range of 80° C. to 100° C. for period in the range of 3 to 4 hours followed by pushing at 17 to 20 psi nitrogen pressure to prepare a transparent spinning dope; wherein the copolymer is selected from poly(acrylonitrile-co-methacrylic acid) or sulfonated polystyrene-divinyl benzene copolymer as cation exchange resin (CXR);

b) extruding spinning dope as obtained in step (i) through external orifice of a double orifice spinneret maintaining extrusion rate in the range of 30 to 100 g/minute;

c) flowing water through the internal orifice of a double orifice spinneret maintaining flow rate is in the range of 20 to 50ml/minute;

d) maintaining polymer extrusion rate in the range of 35 to 42 meters/minute for period in the range of 3 to 4 hrs;

e) gelling the outer surface of the extruded hollow fiber in water bath maintained at temperature in the range of 25 to 30° C. followed by washing with water and immerging in methanol for period in the range of 4 to 5 hrs to obtain hollow fiber ultrafiltration polymeric membrane.

15. A process as claimed in step (a) of claim 14, wherein organic solvent used is selected from the group consisting of dimethylformamide (DMF), N-Methyl-2-pyrrolidone (NMP) or Dimethyl sulfoxide (DMSO).

16. A process of claim 14, wherein the membranes were spun with a production rate of 8,400 to 10,800 meters length in a batch.

* * * * *